(12) United States Patent
Camboni

(10) Patent No.: US 12,325,587 B2
(45) Date of Patent: Jun. 10, 2025

(54) LIFT FOR AUTOMATIC STORAGE SYSTEMS

(71) Applicant: SYSTEM LOGISTICS S.P.A., Fiorano Modenese (IT)

(72) Inventor: Massimiliano Camboni, Modena (IT)

(73) Assignee: SYSTEM LOGISTICS S.P.A., Fiorano Modenese (IT)

( * ) Notice: Subject to any disclaimer, the term of this patent is extended or adjusted under 35 U.S.C. 154(b) by 249 days.

(21) Appl. No.: 17/797,484

(22) PCT Filed: Apr. 27, 2021

(86) PCT No.: PCT/IB2021/053440
§ 371 (c)(1),
(2) Date: Aug. 4, 2022

(87) PCT Pub. No.: WO2021/220143
PCT Pub. Date: Nov. 4, 2021

(65) Prior Publication Data
US 2023/0053553 A1 Feb. 23, 2023

(30) Foreign Application Priority Data
Apr. 30, 2020 (IT) .......................... 102020000009502

(51) Int. Cl.
*B65G 1/04* (2006.01)
*B65G 1/02* (2006.01)

(52) U.S. Cl.
CPC ........... *B65G 1/0435* (2013.01); *B65G 1/026* (2013.01); *B65G 1/0492* (2013.01)

(58) Field of Classification Search
CPC .. B65G 1/0407; B65G 1/0485; B65G 1/0492; B65G 1/0414
See application file for complete search history.

(56) References Cited

U.S. PATENT DOCUMENTS

| | | | |
|---|---|---|---|
| 6,321,138 B1 * | 11/2001 | Livesay | B65G 1/0414 700/215 |
| 9,738,448 B1 * | 8/2017 | Yamagishi | B65G 1/0435 |
| 2007/0144991 A1 | 6/2007 | Hansl | |
| 2011/0262253 A1 * | 10/2011 | Krizmanic | B60L 53/20 414/279 |

(Continued)

FOREIGN PATENT DOCUMENTS

| | | |
|---|---|---|
| EP | 2527274 A1 | 11/2012 |
| KR | 20170106410 A | 9/2017 |

(Continued)

*Primary Examiner* — Kaitlin S Joerger
(74) *Attorney, Agent, or Firm* — Chrisman Gallo Tochtrop LLC

(57) ABSTRACT

A lift for automatic storage systems, comprising: a platform (2), predisposed to support one or more objects on a substantially horizontal rest plane (A); a guide structure (3), predisposed to guide the platform (2) in displacement along a vertical direction; a motor means, predisposed to activate the platform (2) in motion along the guide structure (3). The lift comprises a manipulator (4) associated with the platform (2) and configured to translate an object to be loaded/unloaded from the platform (2), along a horizontal exchange direction (X) in opposed directions.

11 Claims, 9 Drawing Sheets

(56) References Cited

U.S. PATENT DOCUMENTS

| | | | | |
|---|---|---|---|---|
| 2013/0129469 A1* | 5/2013 | Salichs | ................ | B65G 1/026 |
| | | | | 414/807 |
| 2014/0124462 A1* | 5/2014 | Yamashita | ............ | B65G 1/1378 |
| | | | | 211/1.57 |
| 2015/0203294 A1* | 7/2015 | Yamada | ............... | B65G 1/0407 |
| | | | | 294/81.6 |
| 2015/0336741 A1* | 11/2015 | Ahammer | .............. | B65G 1/065 |
| | | | | 414/281 |
| 2016/0137418 A1* | 5/2016 | Traversa | ............. | B65G 1/0414 |
| | | | | 414/807 |
| 2017/0057745 A1* | 3/2017 | Ueda | ................... | B65G 1/1373 |
| 2017/0121110 A1 | 5/2017 | Zombori | | |
| 2018/0050870 A1* | 2/2018 | Mathi | ................ | B65G 1/0492 |
| 2018/0127208 A1* | 5/2018 | Preidt | ................ | B65G 1/0485 |
| 2019/0177095 A1* | 6/2019 | Ukisu | ................ | B65G 1/0485 |
| 2019/0352093 A1* | 11/2019 | Utriainen | ............. | B65G 1/0414 |
| 2020/0062502 A1* | 2/2020 | Kütt | .................... | G07F 11/1653 |
| 2020/0122925 A1* | 4/2020 | Abou-Chakra | ....... | B65G 1/0492 |
| 2020/0166267 A1* | 5/2020 | Boer | ....................... | F25D 13/04 |
| 2020/0172334 A1* | 6/2020 | Yamashita | ............ | B65G 1/065 |
| 2021/0309457 A1* | 10/2021 | Tsuji | .................... | B65G 1/0421 |
| 2021/0395015 A1* | 12/2021 | Ahammer | ............ | B65G 1/0492 |
| 2022/0204271 A1* | 6/2022 | Iwata | ................... | B65G 1/1375 |
| 2022/0315339 A1* | 10/2022 | Pescini | ................ | B65G 1/1375 |
| 2022/0402699 A1* | 12/2022 | Schauer | ............... | B65G 1/1373 |
| 2023/0001959 A1* | 1/2023 | Iwata | ....................... | B61B 13/02 |
| 2023/0008035 A1* | 1/2023 | Hart | ........................ | B65G 1/04 |
| 2023/0041684 A1* | 2/2023 | Nako | ................... | B65G 1/0492 |

FOREIGN PATENT DOCUMENTS

| | | |
|---|---|---|
| WO | 2005061363 A2 | 7/2005 |
| WO | 2015155556 A1 | 10/2015 |

* cited by examiner

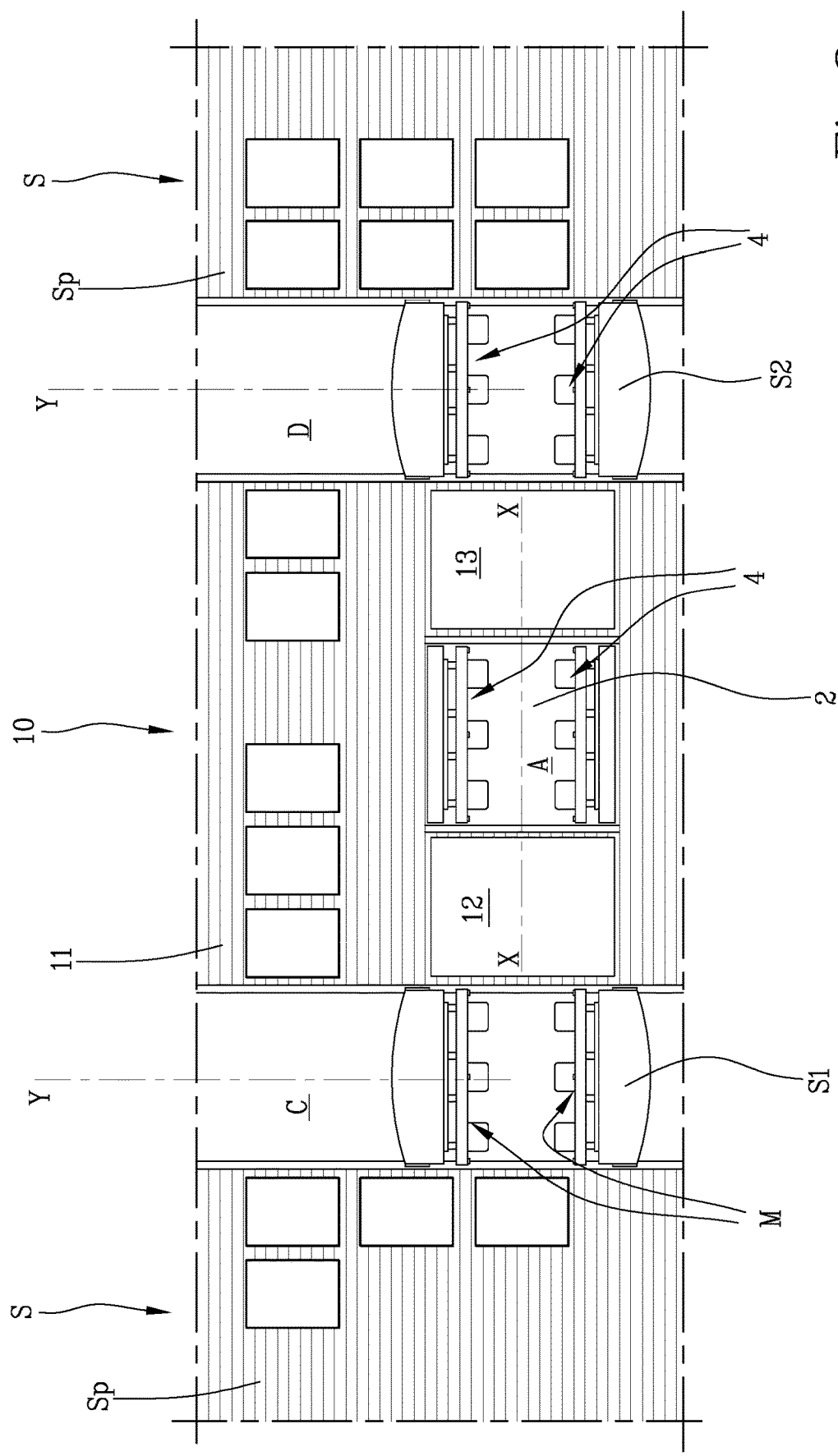

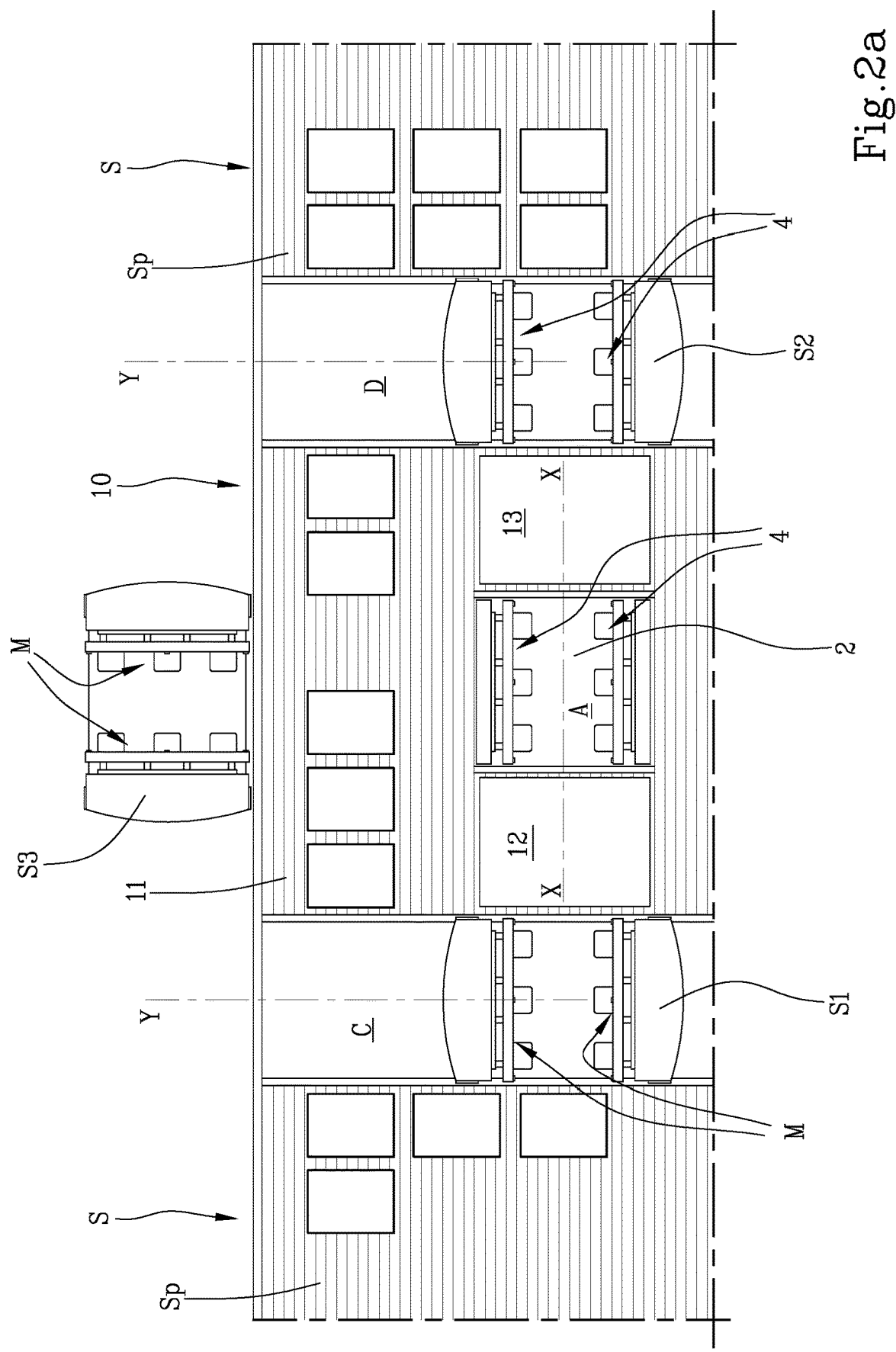

LIFT FOR AUTOMATIC STORAGE SYSTEMS

The present invention relates to a lift for automatic storage systems.

The invention relates in particular, but not exclusively, to the lifts used in automatic storage and sorting systems.

As is known, such systems comprise a plurality of positions for the storage of objects of various shapes and sizes. The various positions are generally distributed inside shelvings that have numerous floors or levels, until reaching relatively high heights from the ground. The shelvings are distributed longitudinally inside the system along mutually parallel aisles, which can reach substantial lengths. Furthermore, transversally to the shelvings, at the ends of the shelvings themselves or in another position, there may be one or more loading and unloading stations for objects that must be positioned in the shelves, or that have been picked up from the shelves and must be taken to another destination.

The systems comprise one or more peripheral stations for the entry and exit of items, substantially located on the ground or in raised positions. An item to be positioned inside the system is arranged at a peripheral station and is picked up therefrom and taken to the provided storage position by means of a movement system of the type known in the sector. Instead, in the event that an item needs to be picked up from the warehouse, the movement system provides to pick up the item from its storage position and to take it to the peripheral station.

The movement system internal to the system generally comprises a plurality of shuttles, movable along paths that extend longitudinally between the shelvings and transversally to the ends of the shelvings. Each shuttle is provided with a gripping tool, structured to pick up and load on board one or more items located in a storage position inside a shelving, and to deposit one or more items transported on board in a storage position. In general, paths are provided, which are distributed on different levels, one for each level of the shelvings. To move the items between one level and the other of the paths, lifts are normally used, which are located in certain positions along the paths themselves.

In current systems, the movement system consists of a shuttle which loads/unloads the items, a conveyor for transporting the items from the shuttle to the lift and the lift itself. The lifts can therefore receive, from a shuttle, one or more items to be brought to ground level or to another level, so that they can be picked up by another conveyor which carries the items to another shuttle or to an external station.

Currently, lifts are substantially platforms which are vertically movable by relevant motor systems. In some solutions, such as for example those described in documents WO2005061363 and KR20170106410, the lifts are provided with motor systems which enable the packages to be moved on a horizontal plane, along a predetermined direction. However, such motor systems are relatively complex and bulky. Furthermore, they do not enable sufficient flexibility in the positioning of the lifts inside the system.

Current lifts can therefore be improved from the point of view of the installation and use possibilities.

The object of the present invention is to provide a lift which enables the characteristics of current lifts to be improved.

The main advantage of the lift according to the present invention is that it enables more efficient movement of the objects present inside the system.

Additional features and advantages of the present invention will become more apparent from the following detailed description of one embodiment of the invention, illustrated by way of non-limiting example in the appended figures in which:

FIG. 2 shows a plan view of a first embodiment of a storage system that uses a lift according to the present invention;

FIG. 2a shows a plan view of a second embodiment of a storage system that uses a lift according to the present invention;

Figure 1:
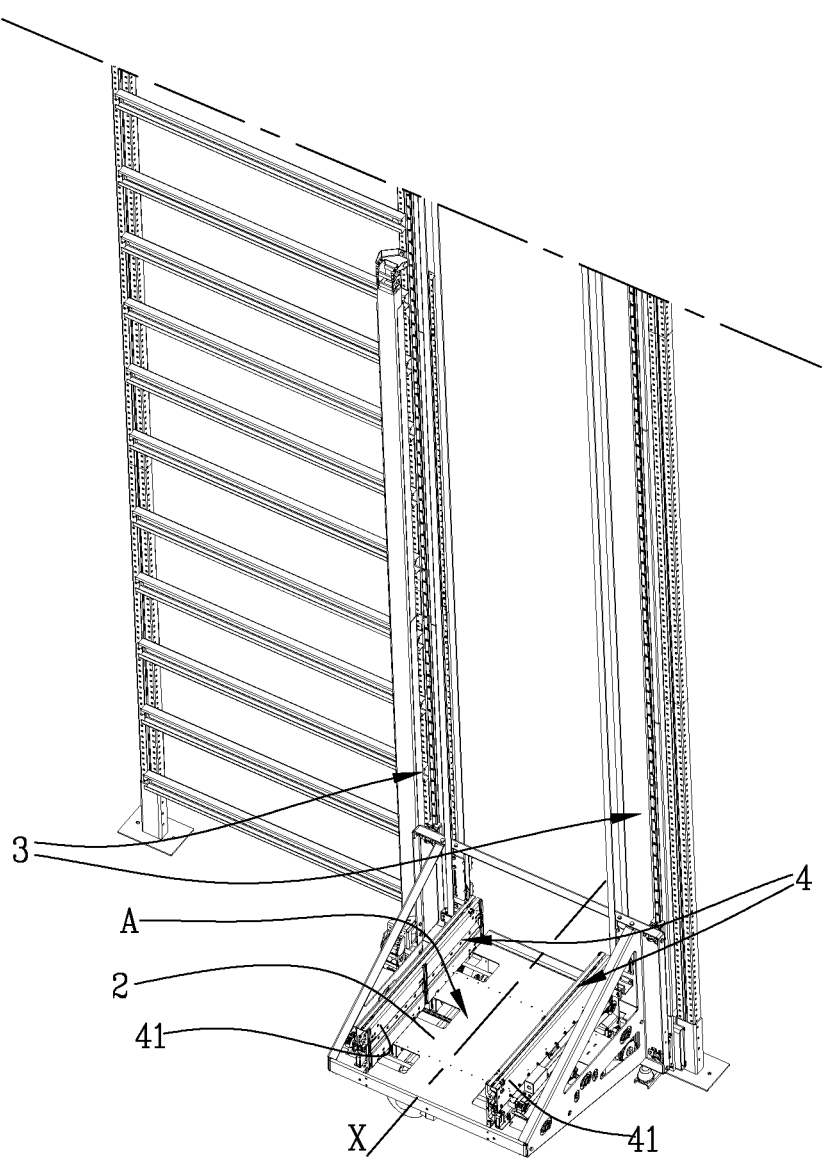
FIG. 1 shows a schematic isometric view of a lift according to the present invention.

The lift (E) according to the present invention comprises a platform (2), arranged to support one or more objects on a substantially horizontal rest plane (A). The platform (2) comprises for example a flatbed and/or base, shaped and structured to be able to support one or more objects.

The platform (2) is vertically movable along a guide structure (3). Such guide structure (3), known in the sector and therefore only illustrated schematically, has a vertically oriented column structure. In the illustrated embodiment, the guide structure (3) comprises two vertical walls, parallel and opposed one another, each of which bears a pair of vertical uprights.

The platform (2) is arranged between the two walls and is engaged, on opposite sides, to the vertical uprights. A motor means, not illustrated as known in the sector, is connected to the platform (2) for activating the displacement thereof along the guide structure (3).

Advantageously, the lift (E) according to the present invention comprises a manipulator (4), associated with the platform (2). The manipulator (4) is configured to translate an object to be loaded/unloaded from the platform (2), along a horizontal exchange direction (X) in opposed directions. Thanks to the presence of the manipulator (4), the lift (E) according to the present invention is able to load or unload an object, placed in a position within the action radius of the manipulator itself. Furthermore, given that the manipulator (4) is able to operate in opposed directions, the action radius of the manipulator (4) extends on two sides of the platform (2). This enables the manipulator (4) to pick up an object placed at one side of the platform (2), load it on board the platform (2) and unload it on the opposite side of the platform (2). The lift (E) can therefore be used as a means for displacing objects along the exchange direction (X).

In the illustrated embodiment, the manipulator (4) comprises a pair of telescopic motorized arms (M1, M2), movable parallel to the exchange direction (X) between an external position, in which they are able to pick up or release an object placed in a position external to the platform (2), and an internal position, in which they are able to pick up or release an object on board the platform (2). The arms (M1, M2) are movable in the two opposed directions along the exchange direction (X), and are able to reach two external positions, arranged at opposite sides of the platform (2). The manipulator (4) is illustrated in FIGS. 4 to 7 and will be better described further below.

The lift (E) according to the present invention enables the realization of an automatic storage system which is notably more efficient with respect to current systems. Furthermore, the particular characteristics of the lift (E) according to the present invention enable the number of components, and the installation times required, for the realization of the system, to be notably reduced given that conveyors serving the lifts are no longer necessary. In fact the main but not only advantage offered by the present invention is that the lift (E), by directly performing the function of displacing the objects along the exchange direction (X), enables the installation and use of the transport devices to be overcome which, in current systems, are necessary for performing the displacements between the shuttles and the lifts.

Furthermore, the structural simplicity of the manipulator (4) enables the lift (E) to be installed substantially within the plan dimensions of a shelving (10), as can be seen better below.

Such storage system is depicted, in a view from above, in FIG. 2. The system comprises at least one shelving (10), provided with one or more substantially horizontal levels (11). The levels (11) are intended to house and support the objects managed inside the system. In substance, one level (11) is defined by a structure that has a horizontal rest plane, suitable to support a variety of objects. In a typical embodiment, one level (11) can be formed by a plurality of shelves, arranged at the same height with respect to the ground, so as to define a horizontal rest plane. The various levels (11) have a horizontal longitudinal direction (Y) with a greater extension, i.e. a direction along which, on a horizontal plane, they have a greater extension.

In other words, the levels (11), and therefore the shelving (10) comprising the various levels (11), have, on the plan view, an elongated conformation along the longitudinal direction (Y). The longitudinal directions (Y) lie on a same vertical plane.

Each level (11) comprises at least one exchange area, aligned with the lift (E) along the exchange direction (X). In the illustrated embodiment, which is preferred but not exclusive, each level (11) comprises two exchange areas (12,13), aligned along the exchange direction (X) and vertically aligned with the exchange areas (12,13) of the other levels (11). In other words, each level (11) comprises a first (12) and a second (13) exchange area. The first exchange area (12) is vertically aligned with the first exchange area (12) of the other levels (11). Likewise, the second exchange area (13) is vertically aligned with the second exchange area (13) of the other levels.

A lift (E) according to the present invention is located with the guide structure (3) interposed between the exchange areas (12,13) of the levels (11). In other words, the guide structure (3) is arranged through the levels (11), in particular it is arranged through relevant openings, afforded through each level (11) and vertically aligned. In each level, the exchange areas (12,13) are arranged at opposite sides of the guide structure (3), i.e. at opposite sides of the opening through which the guide structure (3) is arranged. The location of the guide structure (3) between the exchange areas (12,13) of the various levels (11) is such that the platform (2) can be arranged between the exchange areas (12,13) of each level (11), and the manipulator (4) can access each exchange area (12,13) of the level (11). In substance, the manipulator (4) can transfer one object from the first exchange area (12) to the second exchange area (13), or vice versa.

Each level (11) can be provided with various pairs of exchange areas (12,13) horizontally aligned with one another. Each pair of exchange areas (12,13) is served by a lift (E) according to the present invention, in the modalities described above.

Figure 3:
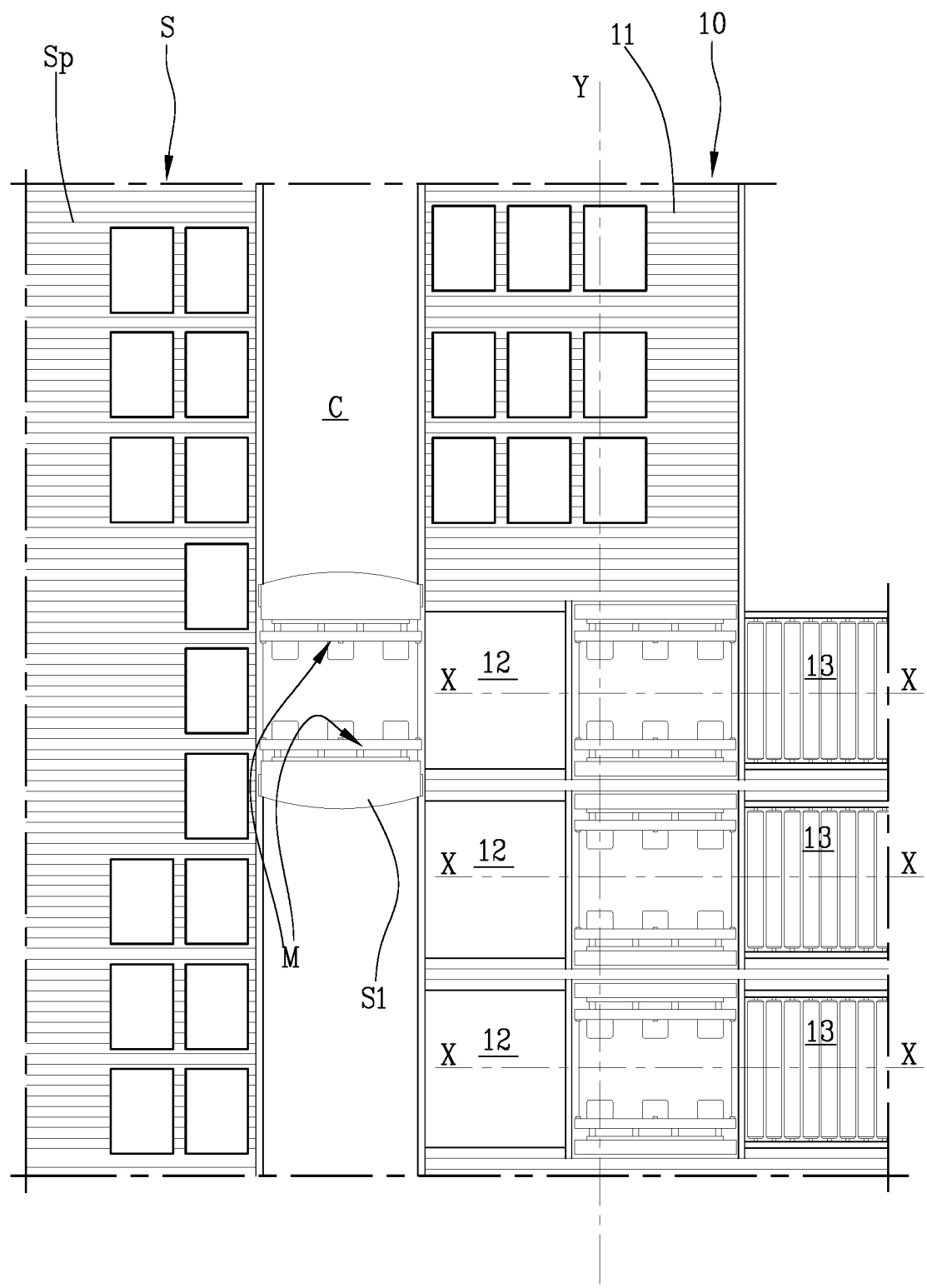
FIG. 3 shows a plan view of a third embodiment of a storage system that uses a lift according to the present invention.

In the embodiments illustrated in FIGS. 2, 2a and 3, the exchange direction (X) is perpendicular to the longitudinal direction (X). The possibility to pass an object between the two exchange areas (12,13) by means of the manipulator (4) represents a significant advantage, as an object can be transferred from one side to the other of the level (11) directly on the level (11) itself, i.e. without the need for further transfer means and/or paths.

Figure 3A:
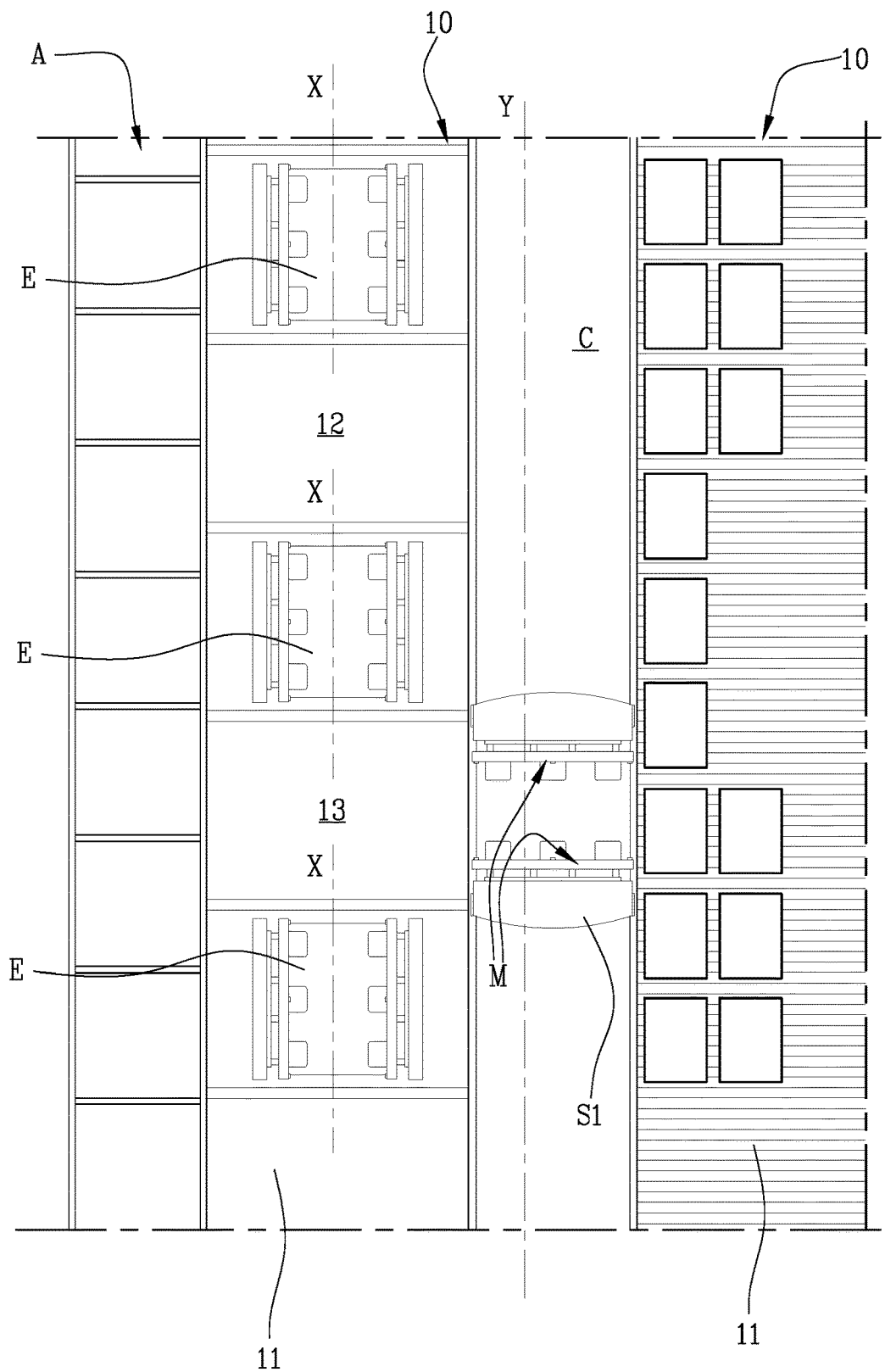
FIG. 3a shows a plan view of a fourth embodiment of a storage system that uses a lift according to the present invention.

In the embodiments illustrated in FIG. 3a, the exchange direction (X) is arranged parallel to the longitudinal direction (Y). In that case, the possibility to pass an object between the two exchange areas (12,13) by means of a manipulator (4) represents a significant advantage, as an object can be transferred along one level (11) and along the longitudinal direction (Y), without the need for other transport or displacement means, but exploiting the lift (E).

With reference to the embodiment illustrated in FIG. 3a, it is possible to provide two or more lifts (E), aligned along the longitudinal direction (Y) and spaced out by exchange areas (12,13). In substance, on one level (1), an exchange area (12) is interposed between two adjacent lifts (E), while another exchange area (13) is interposed between the two successive adjacent lifts (E). In the portion of system illustrated in FIG. 3a, three lifts (E) and four exchange areas (12,13) are illustrated, of which two are interposed between adjacent lifts (E). The three lifts (E), by means of the respective manipulators (4), can be used for transferring the items between the two exchange areas (12,13) placed at the ends of the series, without any need for further transport means. This obviously represents a further degree of flexibility in the logistical management of the items both on one shelf (11) and on different shelves (11). In fact, as well as enabling a displacement along the exchange direction (X) on a shelf, each lift (E) enables the items to be displaced between the different shelves (11) of the shelving.

Furthermore, given that the guide structure (3) is arranged through the levels (11), i.e. it is arranged through appropriate openings, afforded through each level (11) and aligned vertically, the lift (E) does not occupy any further space on the plan view with respect to the shelving (10), i.e. the lift (E) remains contained within the plan dimensions of the shelving (10).

Furthermore, with this configuration, two lifts (E) can serve or pick up objects from a common location. This leads to numerous advantages in terms of system performance and reliability.

The storage system can be provided, for each level (11), with at least one shuttle (S1) movable along a horizontal and perpendicular direction to the exchange direction (X). In the illustrated embodiment, the system comprises at least two shuttles (S1,S2), movable along horizontal directions perpendicular to the exchange direction (X) and placed substantially at the same height as the level (11) at opposite sides of the level (11) itself. The shuttles (S1,S2) are known in the field and will therefore not be described in further detail.

Each shuttle (S1,S2) comprises a gripping means (M), structured to access a respective exchange area (12,13). The gripping means (M) is structured to pick up or release an object in an exchange area (12,13) or on board the shuttle. For example, through the gripping means (M), an object can be picked up from an exchange area (12,13), or from another area of the level (11), loaded on board a shuttle (S1,S2) or brought to another destination, at which it can be unloaded, still through the gripping means (M). In an advantageous embodiment, the gripping means (M) comprises a manipulator (4) like the one used for the lift (E).

In the embodiments depicted, the shuttles (S1, S2) are movable along respective aisles (C,D) arranged along opposite sides of the level (11). Obviously, in a solution in which only one shuttle (S1) is provided, the system is equipped with only one aisle (C), placed to one side of the level (11).

In the embodiments of FIGS. 2, 2a and 3, thanks to the lift (E) according to the present invention, one or more objects can be transferred from a first shuttle (S1) to a second shuttle (S2) through the level (11), by means of the manipulator (4). For example, an object can be brought to and unloaded at the first exchange area (12) of the first shuttle (S1). Subsequently, the manipulator (4), brought to the height of the level (11) of the lift (E), takes the object from the first exchange area (12) and transfers it to the second exchange area (13), transiting through the platform (2). The second shuttle (S2) can then pick up the object from the second exchange area (13) for taking it to another destination. Obviously, once the object has been loaded, the platform (2) could also be displaced vertically to reach a lower or higher level (11), and unload the object at one of the exchange areas (12,13) of the level reached.

In a possible embodiment, illustrated in FIG. 3, an exchange station (13) is provided with a motor means, for translating the objects along a horizontal displacement direction. In the represented embodiment, the exchange station (13) is provided with a motor means, e.g. a motorized conveyor plane, such as a roller conveyor or a movable belt, for the displacement of the objects along a parallel direction to the exchange direction (X). In this case, also the manipulator (4) is preferably in the form of a motorized conveyor plane, such as a roller conveyor or a movable belt.

The embodiment illustrated in FIG. 3a, in which the exchange direction (X) of the lifts (E) is parallel to the longitudinal direction (Y) along which the shuttle (S1) displaces itself, shows further important advantages.

There are more possible displacement directions for the articles, and movement sequences, with respect to a current storage system, using only the lifts (E) and the shuttle (S1). Through the lifts (E), i.e. through the manipulators (4) of each lift (E), it is possible to displace the items on each shelf (11) along the longitudinal direction (Y), through the various exchange areas (12,13) at which an object can be passed from one lift (E) to an adjacent lift. Through the shuttle (S1) and any further shuttles, the objects can be extracted or positioned on the level (11) corresponding to the shuttle (S1), and can further be translated, on board the shuttle (S1), along the longitudinal direction (Y), and can be transferred to a shelf (10) adjacent to the shuttle (S1), placed on the opposite side of the aisle (C). The lifts (E) can obviously be used to translate the objects vertically, between the levels (11) of the shelving.

Thanks to the configuration of the lifts (E), a serving line (A), suitable to act both as a supply and an outlet, can be located parallel to the longitudinal direction (Y), alongside a shelving (10), on the opposite side of the shelving (10) with respect to an aisle (C) along which at least one shuttle (S1) is movable, provided with a manipulator (4). The manipulator (4) of the shuttle (S1) can be used to pick up the objects from the serving line (A), passing through an exchange area (12,13). The manipulator (4) of the shuttle (S1) can release the object picked up on the exchange area (12,13) so that the object can be picked up by one of the lifts (E) or can load the object on board. Alternatively, at least one transfer device, not illustrated, can be interposed between the serving line (A) and at least one of the exchange areas (S1,S2).

In any case, thanks to the conformation and the arrangement of the lifts (E), it is possible to arrange only one serving line (A) for the shelving (10). The serving line (A) can be arranged, for example, at the lower level of the shelving (10). The transfer of the objects from the serving line (A) to the shelving (10) can be performed by means of a shuttle (S1), operating at the lower level of the shelving (10), in the ways described above. The distribution of the objects at the various levels (11) of the shelving (10) can be performed by means of lifts (E).

The system can be provided with one or more further shelvings (S), arranged at opposite sides of the shelving (10) and separated from one another and from the shelving (10) by further aisles (C,D), wherein each further shelving (S) comprises one or more substantially horizontal levels (Sp).

In the storage systems currently available, such passage of objects through one level is not possible. Normally, current systems envisage one or more shuttles which move along a rectilinear exchange path located at one end of the shelving and arranged perpendicularly to the corridors along which the shuttles which run alongside the shelving are displaced. Furthermore, displacement stations are provided for moving the objects towards the exchange path. A cycle of displacements of an object from one shelving to another envisages the following steps. The object must be picked up from the starting shelf by a first shuttle, which carries the object to a displacement station which provides to move the object towards the exchange path. A shuttle, which is movable along the exchange path, picks up the object from the displacement station and carries it to the displacement station of the destination shelving, in which it is picked up by a further conveying device, e.g. a roller conveyor or a conveyor belt. In the system provided with a lift (E) according to the present invention, the displacement of an object between adjacent shelvings takes place by the lift (E) itself, i.e. through the platform (2) using the manipulator (4). Therefore, neither the displacement stations, nor the exchange path are necessary, and obviously neither are the movable shuttles along the exchange path.

In a further possible embodiment, the storage system comprises an end shuttle (S3). The end shuttle is the same as the shuttle (S1) and is also provided with a gripping means (M) which, preferably, comprises a manipulator (4) of the type used for the lift (E), and described below.

The end shuttle (S3) is movable along a parallel direction to the exchange direction (X), i.e. it is movable along a direction perpendicular to the longitudinal direction of the aisles (C,D). The end shuttle (S3) is arranged at one end of the shelvings (S,10) along a path that enables the shuttle (S3) itself to be positioned along an entire front or end side of the shelvings (S,10), including the end zones of the aisles (C,D). The end shuttle (S3) is able to exchange an object with the shuttles (S1,S2) movable along the aisles (C,D), to enable the displacement of one object from one aisle to the other. The possible presence of one or more end shuttles (S3) therefore enables the displacement of the objects from one shelving to another to be made even quicker, in combination with or alternatively to the displacements performed at the exchange zones (12,13).

In a preferred but not exclusive embodiment, the manipulator (4) comprises a pair of motorized arms (M1,M2). Each motorized arm (M1,M2) comprises a support body (F). In the embodiment depicted, the support body (F) is in the form of a shaped plate but could assume any other form. The support body (F) is movable along the exchange direction (X), by means of a special motor. The exchange direction (X) is substantially the direction along which the displacement of the objects (O1,O2) is required.

A barrier (1) is associated with the support body (F) The barrier (1) is movable between an active position, in which it protrudes from the support body (F) to interact with an object to be displaced, and an inactive position, in which it is not able to interact with an object to be displaced. When the barrier (1) is in the active position, it is possible to transmit the translation of the support body (F) along the exchange direction (X) to an object (O1,O2) placed in a position such as to interfere with the barrier (1) in the active position. When the barrier (1) is in the inactive position, the translation of the support body (F) is not transferred to the object (O1,O2) placed in the same position mentioned above. This allows, for example, to implement a forward stroke of the support body (F), with the barrier (1) in an inactive position, in order to bring the barrier (1) on one side of the object (O1,O2) without interfering therewith. At the end of the forward stroke, it is possible to bring the barrier (1) into the active position and, in this condition, perform a return stroke of the support body (F), in the direction opposite the forward stroke. In the active position, the barrier (1) interferes with the object (O1,O2), causing it to displace integrally with the support body (F) along at least a section of the return stroke.

In general, the collection or deposit of an object takes place through manoeuvres defined by the control software and set based on the type and known dimensions of the object. The barrier (1) can be both active and inactive according to the pitch of the program being run.

The barrier (1) comprises a first connecting rod (10), associated with the support body (1) rotatably about a first axis of rotation (X1). Preferably, but not exclusively, the first axis (X1) is substantially horizontal.

The barrier (1) further comprises a second connecting rod (20), associated with the support body (1) rotatably about a second axis of rotation (X2) parallel to the first axis of rotation (X1).

An arm (30) is rotatably connected to the first connecting rod (10) and the second connecting rod (20) at a third axis of rotation (X3) and at a fourth axis of rotation (X4) respectively parallel to the first and the second axis of rotation (X1,X2). The distance between the first axis of rotation (X1) and the third axis of rotation (X3) is equal to the distance between the second axis of rotation (X2) and the fourth axis of rotation (X4). Thereby, the connecting rods (10,20) and the arm (30) form an articulated parallelogram, in which the connecting rods (10,20) remain parallel to each other and the arm (30) maintains a constant orientation on the plane of rotation perpendicular to the axis of rotation (X1,X2,X3,X4). In particular, the arm (30) maintains a vertical orientation.

A first motor (200) is associated with the first connecting rod (10) and/or with the second connecting rod (20) to rotatably operate the first and/or the second connecting rod about the respective axis of rotation (X1,X2) between a rest position and an operating position. Given the articulated parallelogram connection between the connecting rods and the arm, it is sufficient that only one of the connecting rods is rotatably operated by the first motor to obtain the rotation of also the other connecting rod and the arm (30). In the embodiment depicted, the first motor (200) is associated with the second connecting rod (20).

In the inactive position, the first connecting rod (10), the second connecting rod (20) and the arm (30) are flanked, in a compact configuration flanked to the support body (F). The inactive position of the barrier (1) is defined in the inactive position of the connecting rods (10,20).

The arm (30) is inclined with respect to the connecting rods (10,20) in the operating position of the connecting rods (10,20). For example, the arm (30) is orthogonal to the connecting rods (10,20) in the operating position of the connecting rods (10,20). In the operating position, the arm (30) assumes a position of maximum distance from the support body (F). In the embodiment depicted, the connecting rods (10,20) are arranged substantially orthogonal to the support body (F) but could also be inclined at a different angle with respect to the support body (F). The active position of the barrier (1) is defined in the operating position of the connecting rods (10,20).

The axes of rotation (X1,X2) can be defined, for example, by pins and rotoidal couplings of various kinds. To implement the rotation of one of the connecting rods (10,20), it is possible, for example, to arrange a motorized shaft integral in rotation with one of the connecting rods (10,20). In the embodiment depicted, the motorized shaft is integral in rotation with the second connecting rod (20). Such a motorized shaft is concentric to the axis of rotation (X1,X2) of the connecting rod (20). The motorized shaft may be connected to the first motor (200) directly or through a transmission known to those skilled in the art.

In the active position of the barrier (1), corresponding to the operating position of the connecting rods (10,20), the arm (30) is totally available for interaction with the object (O1,O2). In other words, the contact between the object (O1,O2) and the barrier (1) occurs at the arm (30). The latter is capable of exerting on the object (O1,O2) a uniform and distributed thrust on a section of the object (O1,O2) corresponding to the length of the arm (30). Thereby, the object (O1,O2) remains stable and the risk of overturning is avoided. In other words, the arm (30), in addition to ensuring a greater contact surface with the object (O1,O2) to be moved, also allows to have a support above the point of the centre of gravity of the object itself, giving greater stability during the movement step and preventing the object from overturning.

In the embodiment depicted, the arm (30) has two thinned portions (31,32), aligned along a direction (Z) perpendicular to the axes of rotation (X1,X2). A first thinned portion (31) is pivoted to a first connecting rod (10) about the third axis of rotation (X3). Preferably, but not necessarily, the first thinned portion (31) and the first connecting rod (10) are pivoted together in an end zone.

A second end portion (32) is pivoted to the second connecting rod (20) about the fourth axis of rotation (X4). Preferably, but not necessarily, the second thinned portion (32) and the second connecting rod (20) are pivoted together in an end zone.

Figure 5:
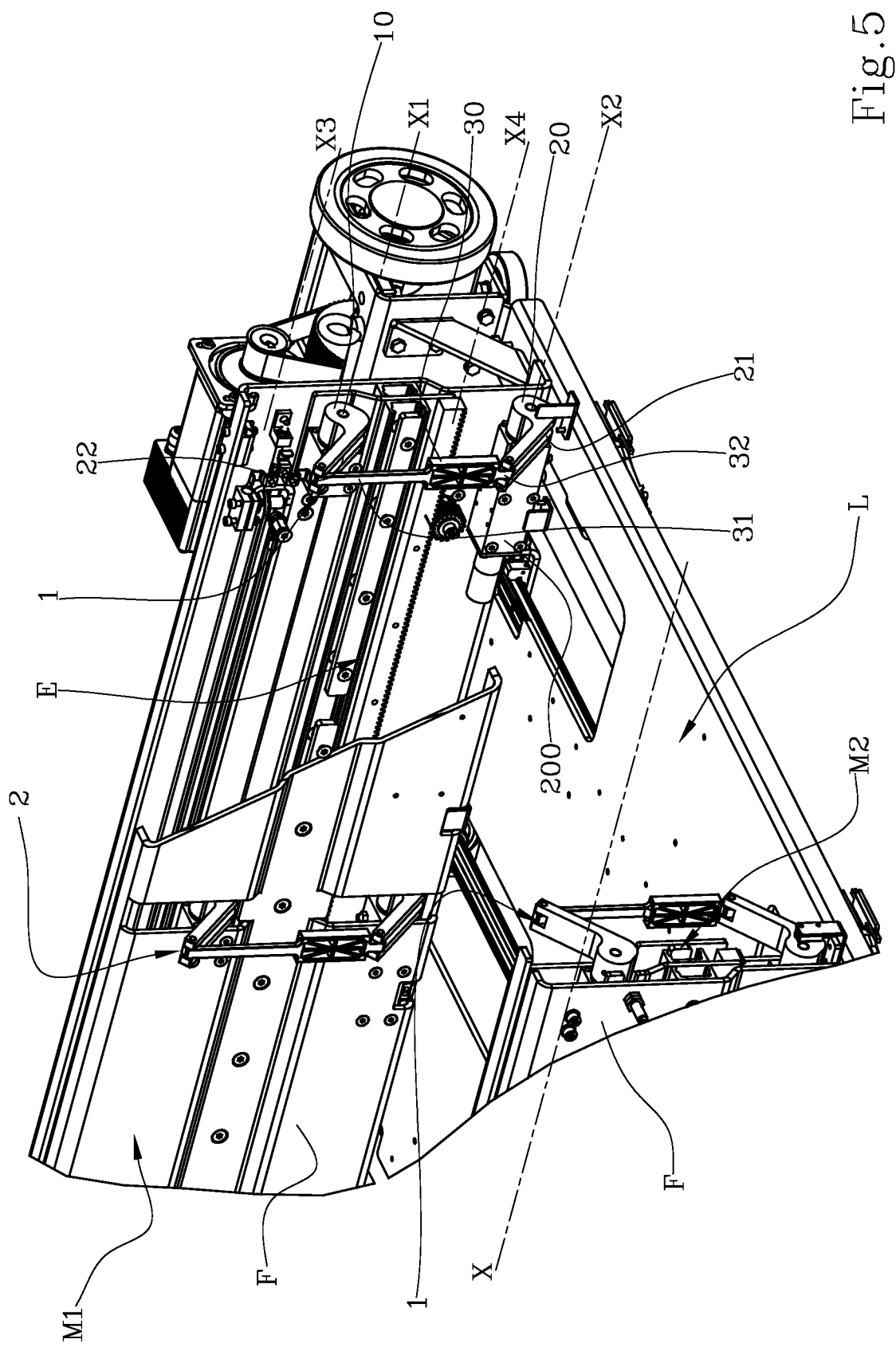
Figure 6:
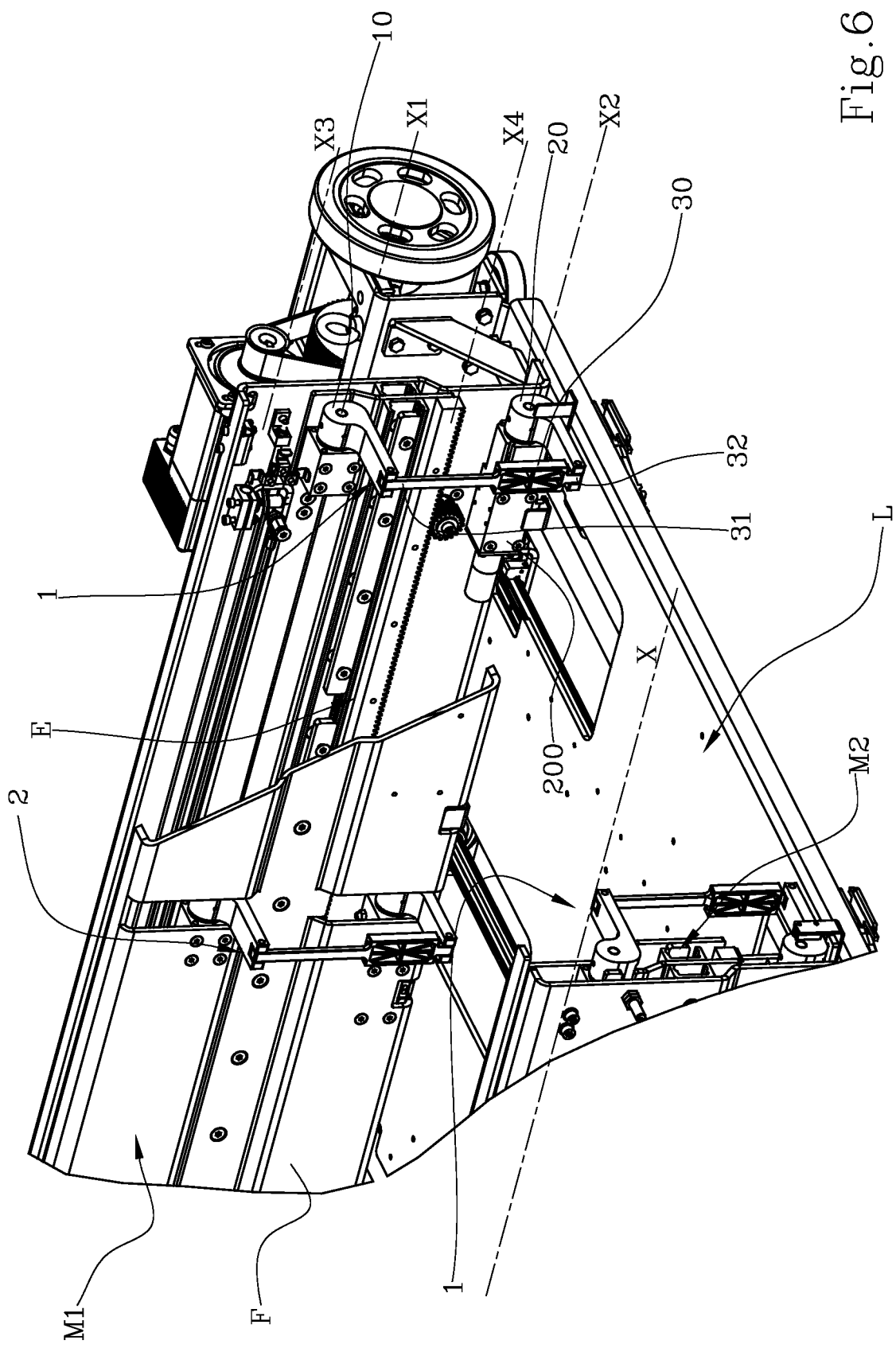
Figure 7:
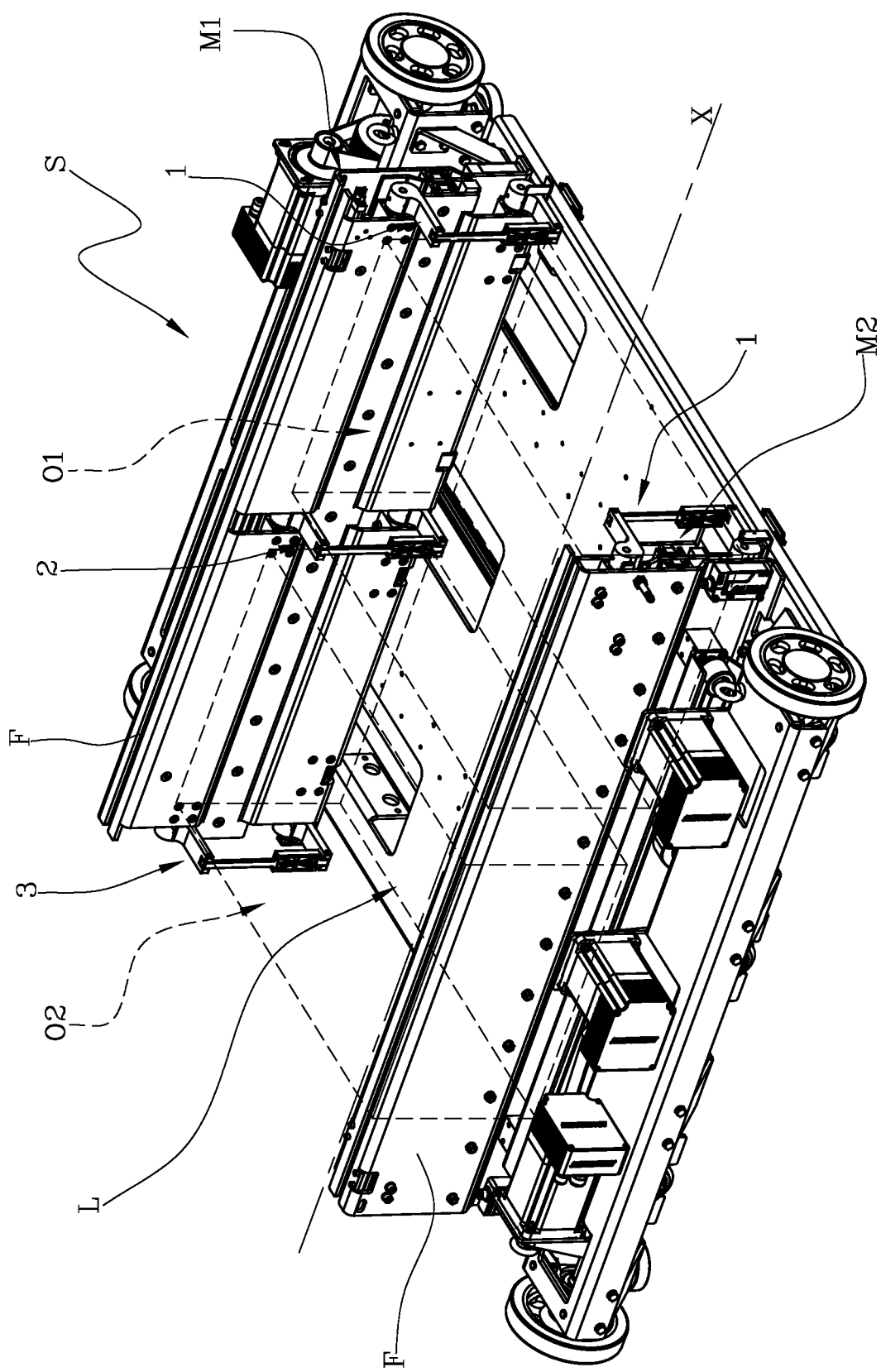

Each connecting rod (10,20) has a groove (11,21) profiled in such a way as to house a respective end portion (31,32) of the arm (30). Thereby, since the end portions (31,32) and the respective connecting rod (10,20) are pivoted in an end zone, in the inactive position of the connecting rods (10,20) the arm (30) can be arranged coplanar to the connecting rods themselves, as shown in FIG. 5. In the inactive position of the connecting rods (10,20), the end portions (31,32) of the arm (30) are housed in the respective grooves (11,21), while a central portion of the arm (30) is interposed between the two connecting rods (10,20). The inactive configuration of the connecting rods (10,20) is therefore particularly compact.

A second motor (E) is connected to the support body (F) to produce a displacement of the support body (F) along the exchange direction (X) parallel to the axes of rotation (X1,X2,X3,X4). Such a second motor (E) is not illustrated in detail as it is available in various solutions known to those skilled in the art. In the embodiment depicted in the figures, the second motor (E) is in the form of a linear motor, provided with one or more sliding elements along the exchange direction (X). One of such sliding elements is associated with the support body (F). In turn, the second motor (E) is connected to a load-bearing structure. Such a load-bearing structure may be of any nature. For example, in the illustrated embodiment, the load-bearing structure is defined by a part associated with the platform (2) of the lift (E) or a part of a shuttle (V1,V2).

Preferably, but not necessarily, each motorized arm (M1, M2) is provided with a second barrier (2), associated with the respective support body (F) at a prefixed distance from the first barrier (1). For example, the second barrier (2) is associated with the support body (F) in a position such that it can be interposed between the two objects (O1,O2), as will be better described below.

The second barrier (2) is substantially equal to the first barrier (1) and comprises a first connecting rod, a second connecting rod and an arm associated with each other in a similar manner to the first barrier (1). The second barrier (2) is aligned with the latter along the axes of rotation (X1,X2, X3,X4). The second barrier (2) is operated synchronously with the first barrier (1). In particular, the second barrier is rotated about the same axes of rotation (X1,X2,X3,X4) as the first barrier (1) and is integral in rotation with the same motorized shaft as the first barrier (1), at its own first or own second connecting rod. The second barrier (2) could however be activated independently with respect to the first barrier (1) by motor means not illustrated, within the reach of those skilled in the art.

Preferably, but not necessarily, each motorized arm (M1, M2) is provided with a third barrier (3), associated with the respective support body (F) at a prefixed distance from the first barrier (1) greater than the distance separating the first barrier (1) and the second barrier (2). In substance, the second barrier (2) is interposed between the first barrier (1) and the second barrier (2). For example, the third barrier (3) is associated with the support body (F) in a position such that it can be on the opposite side of two objects (O1,O2) with respect to the first barrier (1), as will be better described below. Also the third barrier (3) is substantially equal to the first barrier (1) and comprises a first connecting rod, a second connecting rod and an arm associated with each other in a similar manner to the first barrier (1). Also the third barrier (3) is aligned with the latter along the axes of rotation (X1,X2,X3,X4). The third barrier (3) is activated synchronously with the first barrier (1) and with the second barrier (2). In particular, also the third barrier is rotated about the same axes of rotation (X1,X2,X3,X4) as the first barrier (1) and is integral in rotation with the same motorized shaft as the first barrier (1), at its own first or own second connecting rod. The third barrier (3) could however by activated independently with respect to the first barrier (1) and the second barrier (2) by a motor means not illustrated, within the reach of those skilled in the art.

The operating sequence for the displacement of two objects (O1,O2) from a waiting position to a position on board the vehicle (S) occurs in the following modes. Initially the two objects (O1,O2) are arranged side by side along the exchange direction (X), next to the manipulator (4). A first object (O1) is therefore located in an external position, more distant with respect to the manipulator (4) in an initial configuration, whereas the second object (O2) is in a closer position to the manipulator (4) in the initial configuration, substantially interposed between the latter and the object in the external position.

Figure 4:
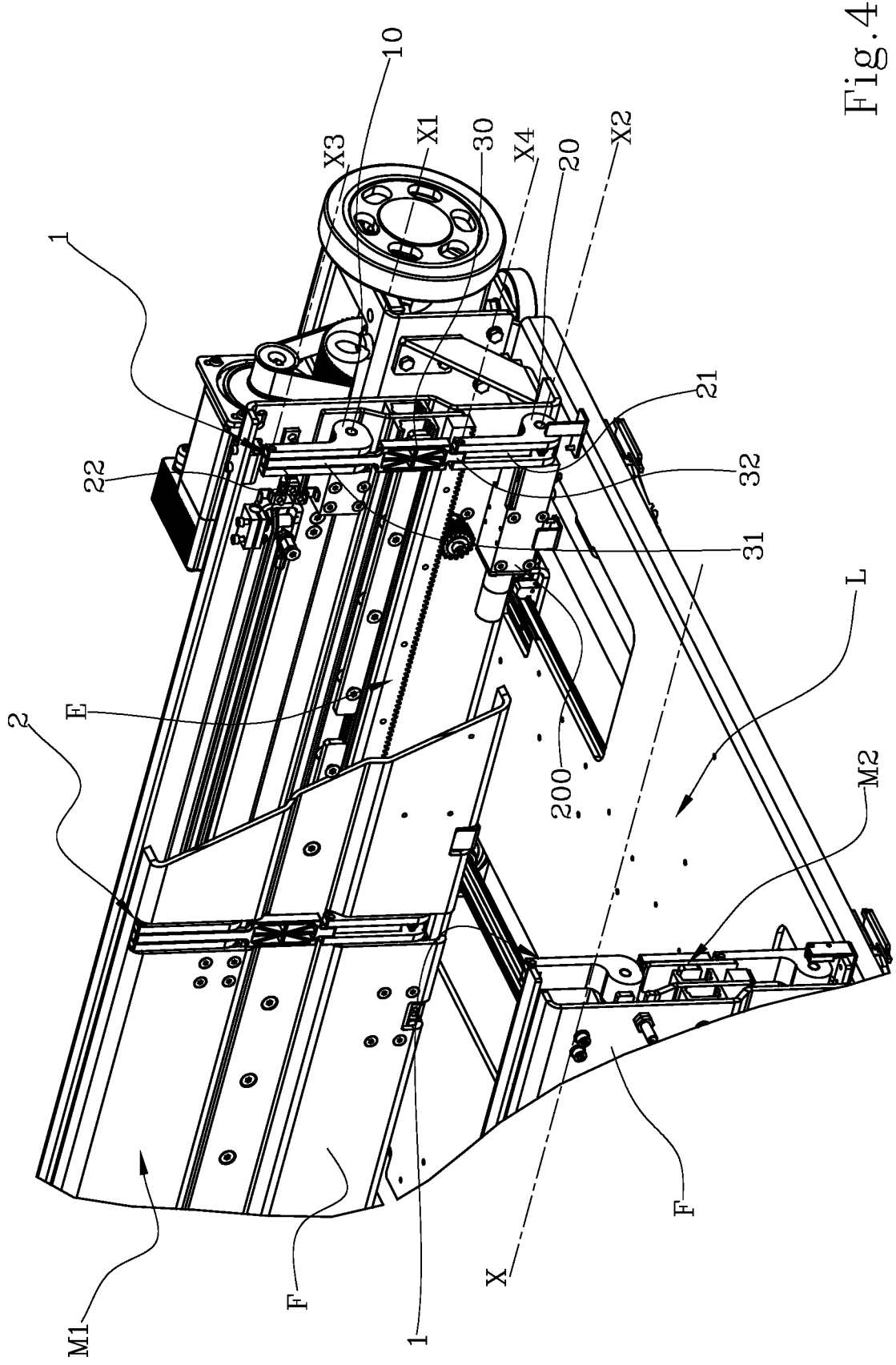
FIGS. 4 to 7 show some views of a device being part of the present invention.

In an initial configuration, the support bodies (F) are on one side of the objects (O1,O2) and the barriers (1,2,3) are in the inactive position. Subsequently, the support bodies (F) displace themselves along the exchange direction (X), passing alongside the objects (O1,O2) without interfering therewith, as the barriers (1,2,3) are still in the inactive position. Once the stroke end of the support bodies (F) is reached, in which the first barrier (1) is on the opposite side of the objects (O1,O2), the barriers (1,2,3) are brought into the active position. From this position, the support bodies (F) displace themselves towards the initial position, dragging therewith the objects (O1,O2) by virtue of the interference between the barriers (1,2) and the objects (O1,O2) themselves (FIG. 4). For the opposite displacement, it is sufficient to reverse the order of the illustrated sequence. In the opposite displacement, the third barrier (3) interacts with the second object (O2), while the second barrier (2) interacts with the first object (O1).

In an embodiment not shown, the second barrier (2) may not be present. In such a case, the second object (O2) displaces itself as a result of a drag operated thereon by the first object (O1). In essence, the first object (O1), dragged by the first barrier (1), comes into contact with the second object (O2), in turn dragging it in displacement. In the opposite displacement, the second object (O2), pushed by the third barrier (3), in turn pushes the first object (O1). In other words, the displacement of two objects, or obviously even of a single object, can be achieved with a manipulator (4) provided with only two barriers.

In the illustrated embodiment, the two motorized arms (M1,M2) are arranged specularly to each another with respect to a vertical plane parallel to the axes of rotation (X1,X2,X3,X4).

The first barriers (1) are opposed each other and symmetrical with respect to a vertical plane parallel to the axes of rotation (X1,X2,X3,X4). In the active position, shown in FIGS. 6 and 7, the two first barriers (1) protrude towards each other, projecting from the respective support body (F). In such a position, the two barriers are capable of interfering with an object (O1) to allow the integral displacement thereof with the support bodies (F). The movements of the support bodies (F) are simultaneous with each other, as are the movements of the barriers (1).

In the inactive position, the first barriers (1) are instead retracted and flanked to the support body (F) thereof. In such an inactive position of the first barriers (1), the support bodies (F) can displace themselves along the exchange direction (X) without interfering with the object (O1,O2). Similarly, the second barriers (2) and the third barriers (3) also move synchronously with each other and with respect to the first barriers.

The manipulator (4), with the support bodies (F), symmetrical and opposed with respect to a vertical plane parallel to the axes of rotation (X1,X2,X3,X4), can be associated with the platform (2).

The invention claimed is:

1. A lift for automatic storage systems, comprising:
a platform (2), predisposed to support one or more objects on a substantially horizontal rest plane (A);
a guide structure (3), predisposed to guide the platform (2) in displacement along a vertical direction;

a motor means, predisposed to activate the platform (2) in motion along the guide structure (3);

wherein the lift comprises a manipulator (4), associated with the platform (2) and configured to translate an object to be loaded/unloaded from the platform (2), along a horizontal exchange direction (X) in opposed directions, the lift being arranged in an automatic storage system comprising a shelving (10), provided with multiple substantially horizontal levels (11), wherein each level (11) comprises two exchange areas (12,13) aligned along the exchange direction (X), the guide structure (3) interposed between the two exchange areas (12,13) of the levels (11), so that the platform (2) can be arranged between the two exchange areas (12,13) so that the manipulator (4) can access each of the two exchange area (12,13) of the level (11), wherein the guide structure (3) is arranged to the side of the exchange areas (12,13) of the levels (11), so that the platform (2) can be arranged aligned along the exchange direction (X) with the exchange areas (12) of each level (11), and so that the manipulator (4) can access the exchange area (12) of the level (11), and wherein for each level (11), at least one shuttle (S1), movable along a horizontal direction parallel to the longitudinal direction (Y) and substantially placed at the same height as the level (11), which shuttle comprises a gripping means (M), structured to access a respective exchange area (12,13).

2. The lift according to claim 1, wherein the manipulator (4) comprises at least one body (F) that is movable parallel to the exchange direction (X) between an external position, in which it is able to pick up or release an object placed in a position external to the platform (2), and an internal position, in which it is able to pick up or release an object on board the platform (2).

3. The automatic storage system of claim 1, the two exchange areas aligned vertically with the exchange areas (12,13) of the other levels (11).

4. The system according to claim 1, wherein each level (11) has a horizontal longitudinal direction (Y) with a greater extension, and wherein the exchange direction (X) is orthogonal to the longitudinal direction (Y).

5. The system according to claim 1, wherein each level (11) has a horizontal longitudinal direction (Y) with a greater extension, and wherein the exchange direction (X) is parallel to the longitudinal direction (Y).

6. The system according to claim 1, comprising, for each level (11), at least two shuttles (S1, S2), movable along parallel directions to the longitudinal direction (Y) and substantially placed at the same height as the level (11) at opposite sides of the level (11), wherein each shuttle (S1, S2) comprises a gripping means (M), structured to access a respective exchange area (12,13).

7. The system according to claim 6, wherein the shuttles (S1, S2) are movable along respective aisles (C,D) arranged along opposite sides of the level (11).

8. The system according to claim 1, comprising one or more further shelvings(S), arranged at opposite sides of the shelving (10) and separated from the shelving (10) by the aisles (C,D), wherein each further shelving(S) comprises one or more substantially horizontal levels (Sp).

9. The system according to claim 1, comprising an end shuttle (S3), provided with a gripping means (M) and movable along a direction parallel to the exchange direction (X), wherein the end shuttle (S3) is arranged at an end of the shelvings (S, 10), along a path that enables the shuttle (S3) itself to be positioned along a front or end side of the shelvings (S, 10), including the end zones of the aisles (C,D).

10. The system according to claim 9, wherein the end shuttle (S3) is able to exchange an object with the movable shuttles (S1,S2) along the aisles (C,D).

11. The lift according to claim 1, wherein the guide structure (3) is interposed between the exchange areas (12,13) of each of the levels (11), the exchange areas (12,13) are arranged at opposite sides of the guide structure (3) such that the platform (2) is arranged between the exchange areas (12, 13) of each of the levels (11), and the manipulator (4) can access each exchange area (12,13) of each of the levels (11) to transfer an object from the first exchange area (12) to the second exchange area (13), or vice versa.

* * * * *